United States Patent
Endl

[15] 3,690,772
[45] Sept. 12, 1972

[54] PHOTOMETER FOR CARRYING OUT MEASUREMENTS AT DIFFERENT WAVE LENGTHS

[72] Inventor: Alfons Endl, Munich, Germany

[73] Assignee: Bio-Cal Instrument Company, Richmond, Calif.

[22] Filed: July 31, 1970

[21] Appl. No.: 60,053

[30] Foreign Application Priority Data

July 31, 1969 Germany..........P 19 39 034.2

[52] U.S. Cl. ..................356/179, 250/226, 250/233, 356/186, 356/205
[51] Int. Cl. ...........................G01j 3/50, G01n 21/22
[58] Field of Search.........250/43.5 R, 218, 226, 233; 356/88, 93-95, 97, 178, 179, 186, 201, 205

[56] References Cited

UNITED STATES PATENTS

| | | | |
|---|---|---|---|
| 2,442,910 | 6/1948 | Thomson....................356/205 |
| 2,679,184 | 5/1954 | Atwood.......................356/97 |
| 2,679,185 | 5/1954 | Atwood.......................356/97 |
| 2,856,811 | 10/1958 | Kaye..........................250/233 |
| 3,137,758 | 6/1964 | Mason et al..................356/95 |
| 3,279,308 | 10/1966 | Bartz et al................356/95 X |
| 3,519,816 | 7/1970 | Bartz et al................356/95 X |

Primary Examiner—Ronald L. Wibert
Assistant Examiner—F. L. Evans
Attorney—Townsend and Townsend

[57] ABSTRACT

Apparatus for measuring the optical characteristics of a sample by determining the absorption of light of different wave lengths by the sample. Light pulses are transmitted via at least three light ray paths at intermittent intervals so that no more than one light path is illuminated during any instant of time. The pulses of one path are used as a reference pulse and the remaining pulses are filtered, aligned and passed through the sample. Light passing the sample as well as light on the referenced paths are then directed to a single photocell. Output signals from the photocell are identified as to which light path they correspond and are maintained steady to prevent light source intensity variations or the like from influencing the reading. The magnitude of the signals is compared with a constant reference signal to determine the optical transmission and/or absorption characteristics of the sample under investigation.

24 Claims, 5 Drawing Figures

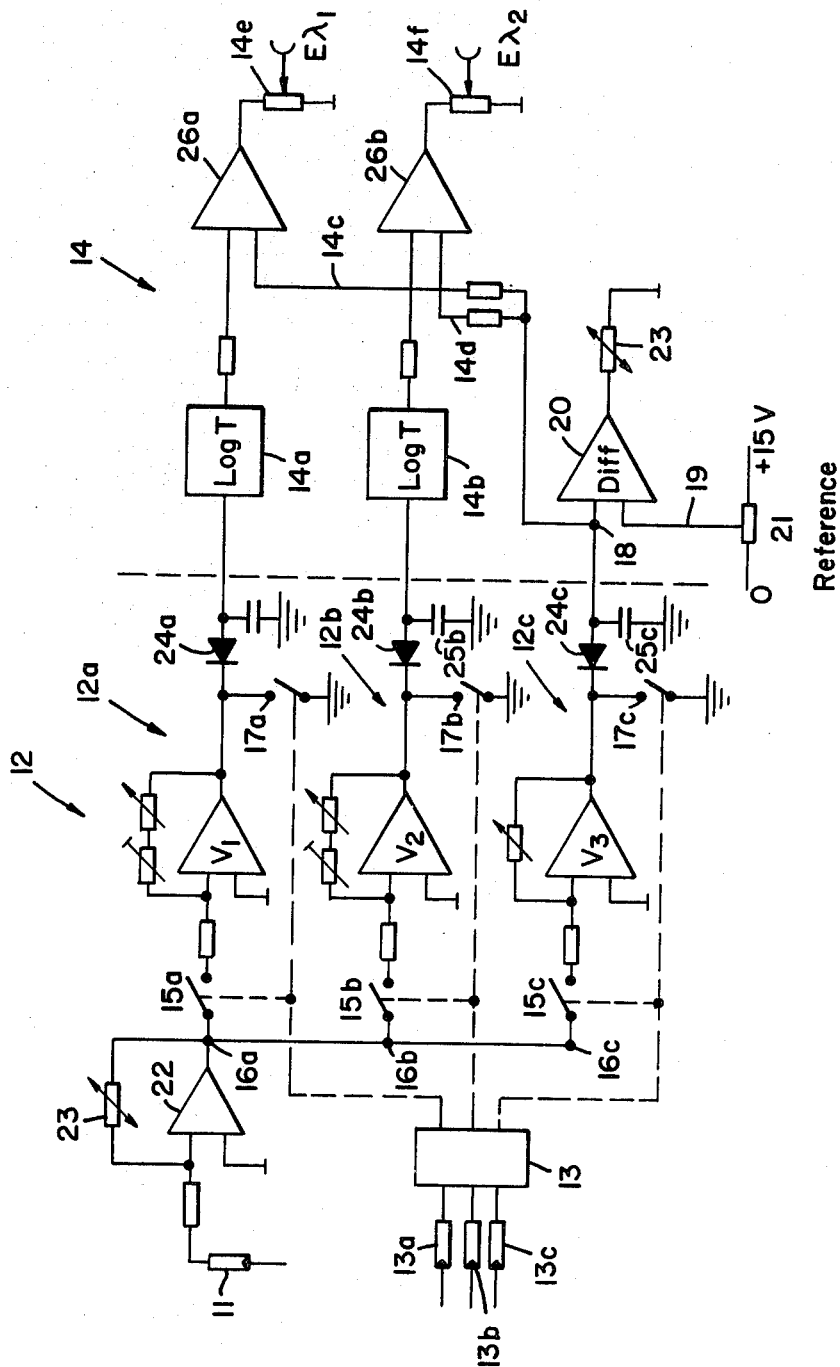
FIG_3
INVENTOR.
ALFONS ENDL
BY
Townsend and Townsend
ATTORNEYS

PHOTOMETER FOR CARRYING OUT MEASUREMENTS AT DIFFERENT WAVE LENGTHS

BACKGROUND OF THE INVENTION

Prior art photometers for measuring the light absorption and transmission of a sample at different wave lengths comprise a light source, means for dividing the light rays emitted by the light source into parallel light ray paths, a disc-shaped diaphragm rotating at a constant speed, means for interrupting the ray paths, and means for passing the rays along the paths cyclically and sequentially for short time intervals. A filter arrangement is disposed downstream of the disc-shaped diaphragm and comprises different filters in the ray paths. Means disposed downstream of the filter arrangement direct the ray paths towards a single photocell past the sample or substrate to be investigated. The photocell is connected to suitable electric circuitry for providing electrical output signals.

In the known photometer the means for dividing the light rays emitted by the light source into parallel ray paths consists of a semi-transparent and a fully reflecting glass plate which have a frequency characteristic that is uniform over the whole frequency spectrum and which split the light from the light source into two light ray paths. The two ray paths are sequentially transmitted during a short passage period through the rotating disc-shaped diaphragm and, upon passage through the two filters, impinge on a mirror arrangement which again joins the two ray paths into a single ray path that intersects the sample. Light rays passing the sample are directed to a photocell where they produce successive pulses or signals that are pre-amplified by an a.c. amplifier. The pre-amplified signals are fed through a discriminator tube controlled operating at 50 cps and are alternately applied to the two branches of a conventional quotient measuring device such as a balanced bridge network, a cross coil or a T-coil recorder, in which the ratio between the values of the pulses of the one ray path and those of the other path of rays is indicated. The known photometer thus can only determine the value of the ratio of the transmissions of the sample at the two different wave lengths.

It is not possible, however, to measure the transmissions at each wave length and at the same time comparing each with a constant reference value. Furthermore, the known photometer thus does not permit measuring of the absorption at different wave lengths.

SUMMARY OF THE INVENTION

It is the object of the invention to provide a photometer for carrying out measurements at different wave lengths, by means of which the light transmission properties of a sample can be determined individually for each wave length by referring to a constant reference value. The photometer of the invention is likewise suited for measuring the light absorption of the sample.

Starting with a photometer of the type initially specified, this is accomplished by the combination of the following features in accordance with the invention:

a. For the transmission of at least three light ray paths the disc-shaped diaphragm is provided with a number of apertures corresponding in number to the number of light ray paths. The apertures are equally spaced in a circumferential direction and are non-overlapping;

b. The means for dividing the rays are provided with at least one dichroic filter placed in the first ray path at an angle of 45°. The first ray path also includes a first light filter. A fully reflecting mirror is placed in the second ray path opposite the reflecting surface of the dichroic filter, also at an angle of 45°, to reflect light rays in the second path onto the dichroic filter and hence in alignment with the first ray path;

c. A common collecting lens is associated with all the ray paths and is disposed downstream of the sample or of the substance to be investigated. The lens joins the light rays from the dichroic mirror as well as those from the third ray path, which serves as reference ray path, at the photocell;

d. The electrical measuring means connected to the photocell comprises a number of branch circuits that corresponds to the number of slot apertures in the disc-shaped diaphragm. The branches are capable of sequential connection to the photocell through a control means so that light rays passing through the same slot aperture always generate output signals in the same branch circuit. The individual branch circuits are connected to a comparator circuit in which the output signals caused by the rays of the first and second paths are compared with the output signals generated by the reference path branch. This feature of the invention results in the advantage that the pulses of each ray path are separately compared with a constant reference value common to all ray paths. Thus, the invention not only permits measuring of relative light transmission values at different wave lengths but also the determination of the absolute transmission itself at different wave lengths.

It is noted that it is known per se from U.S. Pat. No. 2,442,910 to provide a disc-shaped diaphragm with more than two apertures and to form apertures for a control means for for phase-sensitive control of the measuring signals in addition to the slot apertures in the diaphragm. However, this patent relates exclusively to a double-ray photometer comprising a test cell and a reference cell, which photometer does not permit the determination of the transmission of a sample at different wave lengths. Moreover, it is also known to use a dichroic filter for obtaining ray patterns of a certain spectral distribution.

If measurements with two different wave lengths are to be carried out, the dichroic filter used with the photometer of the invention must be of such design that it is transparent to one of the two wave lengths while it acts fully reflecting with respect to the other wave length. For instance, if the measurements are carried out with yellow and blue light and provided the filter in the first ray path is a blue filter and the filter in the second path is a yellow filter, the dichroic filter, which is disposed in the first ray path must be transparent to blue light and must reflect yellow light.

In addition to permitting measurements at two different wave lengths a photometer according to the invention affords the possibility of carrying out such measurements at more than two different wave lengths. If the substance under investigation is to be measured at three different wave lengths, for example, the disc-shaped diaphragm may be provided in addition to the three apertures with another aperture disposed in the described manner and through which a fourth ray path is transmitted. Another, different color filter is disposed in the fourth path. The light rays which pass through this additional filter are reflected in a similar manner, by means of a fully reflecting mirror at a 45° inclination, towards another dichroic filter likewise inclined at 45° and arranged downstream of the first dichroic filter in the path of rays therefrom. The second dichroic filter directs the light rays of the fourth ray path aligned with the first ray path to the sample or the substance to be investigated. If the first dichroic filter is designed, as described above, to be transparent to the blue color and to reflect the yellow color, the second dichroic filter, because of being arranged in the path of rays from the first dichroic filter, must pass blue and yellow light. Furthermore, it must fully reflect the light received from the filter in the fourth ray path. To summarize the above, if the number of ray paths is increased, the dichroic filters and the fully reflecting mirrors, respectively, must be arranged and constructed such that the light pulses produced by the disc-shaped diaphragm pass in one and the same way through the measuring cell or the substance under investigation, the wave length of said light pulses changing periodically.

In a photometer of the invention the control means by which the branch circuits are capable of being successively connected to the photocell preferably is of such design that it comprises a plurality of control photocells corresponding in number to the number of the light paths and being disposed side by side as seen in the direction of the ray paths behind the disc-shaped diaphragm. Control apertures in the disc-shaped diaphragm are associated with the control photocells and spaced in a circumferential direction on different circles not registering with those of the slot apertures. Each control aperture, as seen in the direction of rotation of the disc-shaped diaphragm, is positioned forward of the corresponding slot aperture. Upon energization of the control photocell normally open switches are closed by the control photocells for a period of time which corresponds to one light passage period (determined by the disc speed and the length of the slotted apertures) through the disc-shaped diaphragm. Each switch is connected to another branch circuit and, when closed, connects the main photocell with the applicable branch.

Each branch circuit comprises an amplifier connected downstream of the respective switch and second switching means following said amplifier and disposed parallel to the amplifier outputs. The second switching means are normally closed and are so connected with the control photocells that the first switch as well as the second switching means of one and the same branch circuit are operated for the same period of time by the same control photocell. During the time interval during which a branch circuit is disconnected from the main photocell, that is while its associated first switching means is open, the second switching means is closed and short circuits the output from the amplifier of the circuit branch. Noise is thereby prevented from influencing the operation of the comparing circuit of the branch.

In the photometer of the invention the first and second switches or switching means, respectively, are preferably semiconductors having control electrodes, such as field effect transistors.

To prevent, for instance, changes of the photocell characteristic or fluctuations in brightness of the light source from affecting the measurement which extends over a certain period of time, the output of the reference path branch circuit is connected to one input terminal of a differential amplifier, the other input terminal of which is connected to a reference voltage and the output voltage of which controls the gain of an automatic control amplifier connected in series between the output of the photocell and the parallel inputs of the branch circuits. Thus, upon a change in the input voltage to the differential amplifier the degree of amplification of the automatic control amplifier is readjusted for maintaining said voltage constant. This assures that the output signals of the individual circuit branches are maintained at a constant value even if the characteristic of the photocell or the brightness of the light source should vary.

The comparator circuit to which the individual branch circuits are connected preferably comprises stages connected to the outputs of said branch circuits and supplying at their own outputs a signal which is proportional to the logarithm of the input value of the respective stage. Each of these stages is connected with one input terminal of a differential amplifier. The other input terminal of that amplifier is connected to a constant reference voltage. The outputs of the differential amplifiers are then proportional to the absorption of light by the sample if the constant reference voltage is so selected that the reference voltage and the output of the log stages are equal when the transmission value of the sample equals 1. In this manner, a linear absorption scale is obtained. This is of particular advantage when the apparatus of the invention is connected with recorders.

The slot apertures formed in the disc-shaped diaphragm for the periodic transmission of light rays along the individual ray paths, as well as the control apertures associated with the slot apertures, may be distributed over the whole area of the disc-shaped diaphragm. Preferably, however, an aperture set is disposed in an angular sector of the disc-shaped diaphragm. The disc includes several circumferentially spaced sectors each having the same aperture arrangement.

To eliminate stray light effects and assure that the light rays emitted by the light source do not pass simultaneously through a plurality of the apertures provided in the disc-shaped diaphragm but are transmitted sequentially and through a single aperture at a time, the means for dividing the light rays emitted by the light source into parallel paths of rays comprises a fixed diaphragm arranged optically upstream ahead of the disc-shaped diaphragm, as seen in the direction of the paths of rays. This additional diaphragm is provided with adjacent, radially arranged light transmitting apertures positioned so that they become aligned with the rotating aperture when they pass by. If the above mentioned control photocells are provided, this diaphragm also comprises additional apertures exactly opposite said control photocells.

Conveniently a diaphragm having two apertures, one of which is aligned with the path of rays from the dichroic filter and the other one of which is aligned with the reference ray path. This diaphragm is positioned in front of the collecting lens which converges the light rays at the photocell.

If the light source used is a point light source, a collecting lens is positioned behind the source to align the light rays passing onto the disc-shaped diaphragm.

Two collecting lenses may be provided, one in front and one behind the sample or the substance under investigation, so that a point image of the light source is formed at a point in the sample.

In a similar manner two opposed converging lenses, likewise spaced from each other, may be arranged in the reference ray path for obtaining a point image of the light source.

The invention will be described further, by way of example, with reference to the accompanying drawings, in which:

FIG. 3 is a block diagram of the electrical measuring means connected to the common photocell;

FIG. 5 is a graph showing the cycle of pulses occurring at the output of the common photocell of the photometer of the invention.

Figure 1:
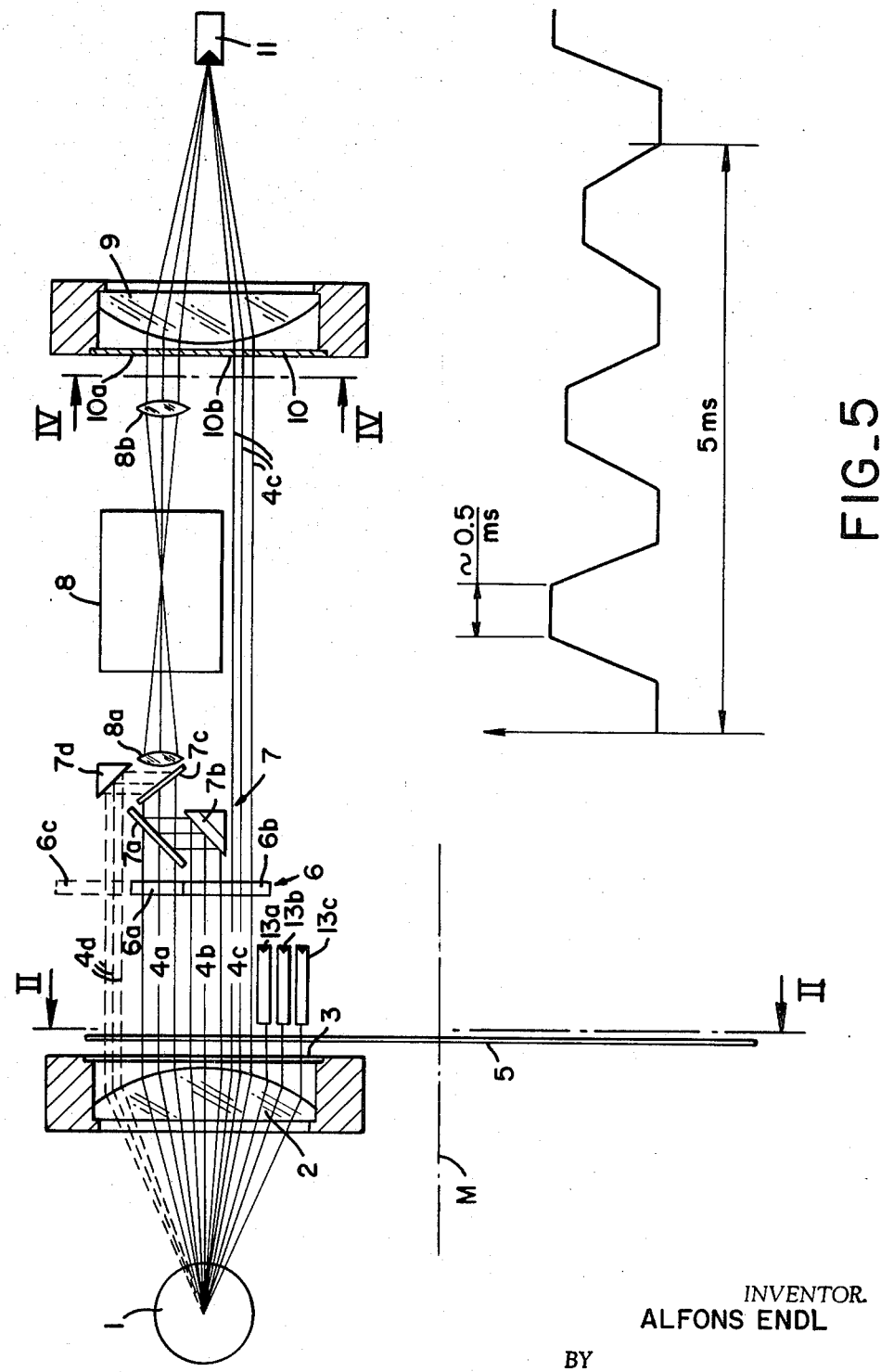
FIG. 1 is a diagrammatic plan view of a photometer of the instant invention up to the point of the common photocell.
Figure 2:
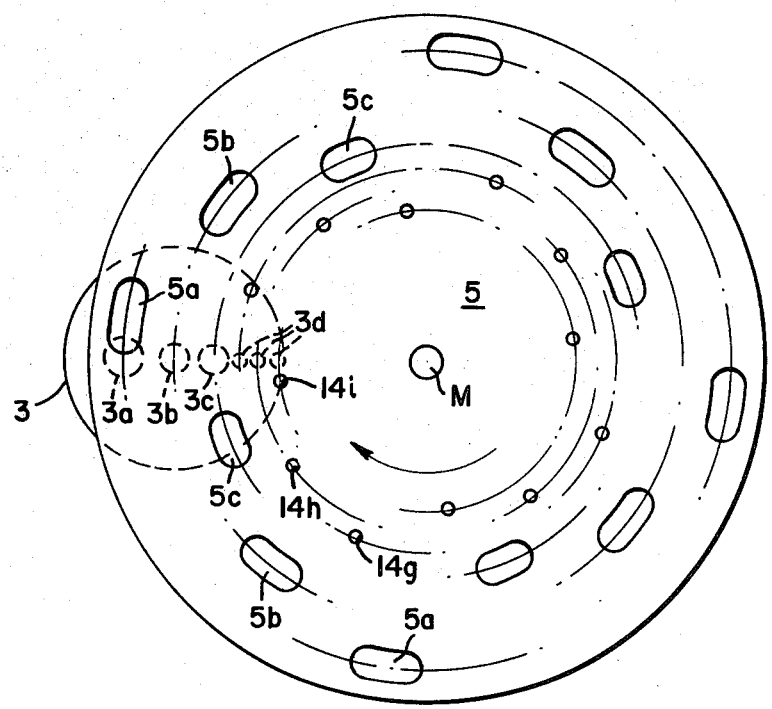
FIG. 2 is a view of the disc-shaped diaphragm used with the invention as seen in the direction of arrows II—II of FIG. 1.

As will be apparent from FIG. 1, the photometer comprises a point source of light 1 behind which there is disposed a collimating lens 2 for parallel alignment of the light rays emitted by the light source. Collimating lens 2 is followed in the direction of the light rays by a fixed diaphragm 3 serving as a means to divide the light rays emitted by the light source into parallel light ray paths. The fixed diaphragm has three light transmitting apertures 3a, 3b, 3c disposed side by side in radial direction, as shown in FIG. 2. Furthermore, the diaphragm is provided with three smaller diameter apertures 3d likewise arranged side by side in radial direction, the function of which will be more fully explained below. Diaphragm 3 is followed by a disc-shaped diaphragm 5 rotating at constant rate and functioning to interrupt the various light ray paths. Diaphragm 5 permits the periodic and successive passage of the light rays through the corresponding apertures 5a, 5b and 5c for short intervals. The disc-shaped diaphragm is provided in each of its four 90° angular sectors with three slot-shaped apertures 5a, 5b and 5c equally spaced in circumferential direction in a non-overlapping manner and disposed at successively greater radial distances from the center of rotation M of the disc-shaped diaphragm, again in a non-overlapping manner. The circles on which the slot apertures 5a, 5b and 5c lie register exactly with the centers of the respective apertures 3a, 3b and 3c of the diaphragm 3, as seen in the direction of the light ray paths in FIG. 2.

The disc-shaped diaphragm further includes three control apertures 14g, 14h and 14i located on different circles, not registering with the circles of the slot apertures 5a, 5b and 5c, in each angular sector. The control apertures are spaced in a circumferential direction such that each control aperture is disposed forward, in the direction of rotation of the diaphragm indicated by the arrow in FIG. 2, from the corresponding slot aperture. When the disc-shaped diaphragm rotates the control apertures successively register with another one of the small diameter apertures 3d in the diaphragm 3 and thus permit the successive passage of three further light rays along three further paths by means of which three control photocells 13a, 13b and 13c (see FIG. 1) are energized. The control photocells are disposed behind the disc-shaped diaphragm 5 exactly opposite apertures 3d. The fixed control photocells 13a, 13b and 13c form part of the electrical measuring means of the photometer to be described in detail below.

The three light rays successively passing through the three slot apertures 5a, 5b and 5c in the disc-shaped diaphragm 5 are identified with reference numerals 4a, 4b and 4c in FIG. 1. Two different filters 6a and 6b of a filter arrangement, generally indicated by 6, are positioned in the ray paths 4a and 4b. Of these, filter 6a, for instance, is a blue filter, while the other filter positioned in path 4b is a yellow filter. Behind the filter arrangement there is disposed means, generally indicated by 7, which serves to direct the light of the three paths of rays 4a, 4b and 4c towards a single photocell 11.

Means 7 comprises a dichroic filter or mirror 7a which is of such design that, if filter 6a is a blue filter and filter 6b is a yellow filter, the mirror is transparent to blue light while it reflects yellow light. The dichroic filter is positioned behind the filter arrangement 6 in ray path 4a at an inclination of 45°, and a fully reflecting mirror 7b also positioned at an angle of 45° in second ray path 4b is associated with the first mirror and has its reflector surface extending parallel to that of the dichroic mirror 7a. Mirror 7b reflects the light rays of the second path 4b towards the mirror 7a.

Figure 4:
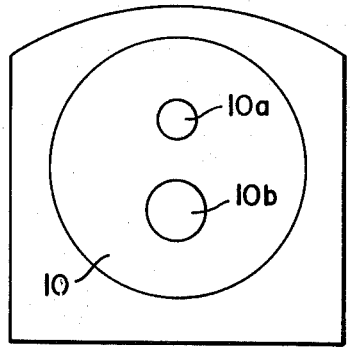
FIG. 4 is a view as seen in the direction of arrows IV—IV of FIG. 1.

A focusing lens 9 is disposed behind a sample 8 through which the light ray path from the dichroic filter is transmitted. Focusing lens 9 is sized and positioned so that light rays that pass through sample 8 as well as light rays of ray path 4c, which serves as a reference ray path as more fully described hereinafter, enter the lens and are all focused on photocell 11. A lens pair 8a and 8b, one in front of and one behind the sample 8 and both positioned in the ray path from dichroic filter 7a, are provided to image light source 1 at the center of sample 8. Immediately forward of focusing lens 9 there is further provided a diaphragm 10 having two apertures 10a and 10b, one of which, 10a, is aligned with ray path 4a coming from dichroic mirror 7a, while the other one, 10b, is aligned with reference ray path 4c (see also FIG. 4).

Photocell 11 is connected to electrical measuring means, indicated generally identified with reference numeral 12 in FIG. 3. Measuring means 12 comprises a number of branch circuits 12a, 12b and 12c corresponding to the number of slot apertures in the disc-shaped diaphragm. By way of control means 13 the circuits are periodically and successively connected with photocell 11 so that their connection with the photocell coincides in time with the passage of the corresponding slot aperture in front of the light source 1. Light rays passing through a given slot aperture thereby always generate output signals in one and the same branch circuit. To effect this switching program, a switch 15a, 15b and 15c, normally open when in inoperative position, is inserted in series in each of the branch circuits 12a, 12b and 12c. Inputs 16a, 16b and 16c of the switches are connected with the output of the photocell 11. The control means, comprising the three above mentioned control photocells 13a, 13b and 13c actuate switches 15a, 15b and 15c in such a manner that they are closed one after the other, upon energization of the control photocells, for a period of time corresponding to one light passage period through the disc-shaped diaphragm. Each photocell cooperates with a specific switch, and it is always this switch which is closed upon energization of the corresponding control photocell.

As FIG. 3 further shows, each measuring branch 12a, 12b and 12c moreover comprises amplifiers $V_1$, $V_2$ and $V_3$, connected at the output end of the respective switches 15a, 15b and 15c, as well as to grounded second switching means 17a, 17b and 17c downstream of said amplifiers. The second switching means are normally closed and are operated by control photocells 13a, 13b and 13c, synchronously with the first switching means so that both switching means of one and the same branch circuit are actuated for the same time period by the same control photocell. Each second switch 17a, 17b and 17c is followed in series in each branch circuit by a rectifier 24a, 24b and 24c, which enables voltage equalization at capacitors 25a, 25b and 25c of the corresponding branch circuits 12a, 12b and 12c.

The output of the branch circuit 12c to which the reference ray path 4c is applied is connected to one input terminal 18 of a differential amplifier 20; the other input terminal 19 is connected to a constant reference voltage 21. The output of amplifier 20 is formed by a thermistor 23. The thermistor forms a feedback connection between the input and the output of an automatic control amplifier 22 connected in series between the output of a photocell 11 and the parallel inputs 16a, 16b and 16c of the three different branch circuits. By means of the thermistor 23 the control efficiency of the automatic control amplifier 22 is controlled such that upon change of the input voltage of the differential amplifier 20 the degree of amplification of the automatic control amplifier is readjusted to keep the voltage constant. This regulating process serves to eliminate any influences on the measurement by changes of the characteristic of the photocell 11 and/or by the voltage fluctuations of the light. Moreover, a constant reference voltage is obtained at the input 18 of the differential amplifier 20, and in a comparator circuit, generally indicated by 14, this reference voltage serves as a valve of comparison with the output signals of the other measuring branches 12a and 12b.

As will be seen from FIG. 3, in addition to the differential amplifier 20, the comparator circuit 14 comprises two stages 14a and 14b connected to the outputs of the two branch circuits 12a and 12b and providing at their outputs a signal which is proportional to the logarithm of the input value of the respective stage. Each stage is connected with the one input terminal of a differential amplifier 26a or 26b, respectively. The other input terminals of differential amplifiers 26a and 26b are connected through lines 14c and 14d, respectively, to the input terminal 18 of the differential amplifier 20, resulting in an amplification in each differential amplifier 26a and 26b of only the difference between the constant reference voltage of terminal 18 and the output signal of the respective step 14a or 14b. The outputs of the differential amplifiers 26a and 26b are formed by variable resistors 14e and 14f, respectively, which enable the changing of the measuring sensitivity. The voltage drop at these resistors is proportional to the respective absorbtion in view of the fact that logarithm stages 14a and 14b are provided and that the output signals thereof are compared with a constant reference voltage having the reference value "1".

Referring again to FIG. 1, it will be appreciated that in addition to the three ray paths 4a, 4b and 4c, for instance, a fourth ray path 4d may be provided so as to be able to test the object being measured by means of a third, different wave length. For this purpose the disc-shaped diaphragm 5 is formed with another properly positioned slot aperture. Further, another filter 6c of the filter arrangement 6 is inserted in the fourth ray path 4d. This filter has a filter characteristic which differs from those of the other filters, the light rays passing through this filter 6c impinging upon a fully reflecting mirror 7d which is inclined at an angle of 45° and reflects the light to a second dichroic filter 7c positioned in the ray path from the first dichroic filter 7a and also being inclined at an angle of 45° and extending parallel to the reflecting surface of a fully reflecting mirror 7d.

If the disc-shaped diaphragm 5 of the photometer illustrated and described above is set into uniform rotational movement, the ray paths 4a to 4c are interrupted. Light is periodically and sequentially sent down the path when a slot aperture sweeps past the corresponding aperture 3a, 3b or 3c in fixed diaphragm 3. In timed sequence therewith and in similar manner the control photocells 13a to 13c are periodically and sequentially energized during a cycle, thereby connecting the branch circuits 12a to 12c sequentially to the photocell 11. The measuring pulses generated by the photocell 11 are thereby distributed to the various branch circuits, and the output signals of the branch circuits 12a and 12b can thus be compared with the constant output voltage of the branch circuit 12c so that voltages proportional to the respective absorbtion can be tapped off resistors 14e and 14f.

The measuring pulses of a cycle as provided by the photocell 11 are shown in FIG. 5. As this figure shows, a typical duration of a cycle corresponding to one 90° angular sector of the disc-shaped diaphragm 5 and comprising three measuring pulses in accordance with the three slot apertures 5a to 5c is 5 msec., while the duration of one individual pulse is approximately 0.5 msec. The duration of the cycle and of the pulse, of course, depends on the speed of rotation of the disc-shaped diaphragm 5 and on the design of the respective apertures. As the first measuring pulse shown in FIG. 5 is associated with the reference ray path, this pulse has the greatest amplitude of the three pulses of the cycle. The other two successive pulses have smaller amplitudes for their amplitudes are damped by the object to be measured in accordance with the characteristics of that object and in dependence on the wave length.

I claim:

1. Apparatus for measuring the light absorption and light transmission of an object with respect to light of different wave lengths comprising a light source, means adjacent the light source for periodically forming at least three sequentially occurring light pulses along at least three different light ray paths, means optically downstream of the light pulse forming means for filtering light in at least two of the paths to obtain at least two sequential relatively narrow band width light pulses, a photocell, means for optically aligning the narrow band width light pulses and for passing such pulses through the object onto the photocell, means optically downstream of the light pulse forming means for passing reference light pulses formed on a third path onto the photocell, and means providing output signals as a function of the relative light intensity between the narrow band width light pulses and the reference light pulses.

2. Apparatus according to claim 1 wherein the means for providing output signals includes compensating means for maintaining the signals constant in response to variations in the intensity of the light pulses.

3. Apparatus according to claim 1 including means forming a control light pulse for each of the first mentioned light pulses, the control light pulses being formed from light from the source in synchronism with the light pulses, a number of electrical branch circuits equalling the number of formed light pulses, and means responsive to the control light pulses for connecting the photocell with the electrical branch circuits so that photocell pulse signals produced by light pulses from a given path are always transmitted to the same branch circuit.

4. Apparatus according to claim 1 including means for comparing photocell emitted signals produced by narrow band width light pulses with a constant reference voltage, and means for adjusting the photocell signals in accordance with light intensity variations in the light pulses formed from the light source.

5. Apparatus for measuring the light absorption and light transmission of a sample under light of different wave lengths comprising: a light source, means for forming at least three parallel paths for light rays from the source, means for periodically and sequentially interrupting the light ray paths so that light can pass along one path only during any instant of time, light filter means optically downstream of the light interrupting including at least one dichroic filter disposed in a first path passing light of one band length and reflecting light of another band length, and means disposed in another path and reflecting light from the other path onto a reflecting surface of the dichroic filter so that first wave band light passes through the filter onto the sample and second wave band light is reflected from the second path into alignment with the first path and reflected by the dichroic filter onto the sample, a single photocell disposed on the side of the sample opposite the dichroic filter, means directing light rays passing through the sample to the photocell, means directing light pulses in a third path directly to the photocell to provide reference light pulses, and electrical means producing output signals indicative of the light intensities of light rays received by the photocell from the sample.

6. Apparatus according to claim 5 wherein the electrical means include means for producing a constant reference signal, and means for producing output signals relative to the reference signal.

7. Apparatus according to claim 6 wherein the light source comprises a point light source, and including first collimating lens means disposed upstream of the sample for producing substantially parallel light rays, and second focusing lens means disposed downstream of the sample for directing light passing the sample and from the third path onto the signal photocell.

8. Apparatus according to claim 5 wherein the means for forming three parallel paths for light rays is disposed adjacent the light source and includes a mask having three openings, and wherein the light ray interruption means comprises a rotatable disc facing the mask, extending into the light ray paths and having a separate light passage aperture for each path, each aperture being positioned for rotation into alignment with an opening in the mask, the apertures being angularly and circumferentially spaced so that they are non-overlapping in a radial direction and a circumferential direction.

9. Apparatus according to claim 8 including control means for determining the light path from which the photocell receives light rays at any instant of time, the control means including a plurality of radially and circumferentially spaced second apertures in the rotating disc, the second apertures being also radially and circumferentially spaced from the light passage apertures, and light sensing means disposed on the side of the disc opposite the light source for receiving light from the light source passed through the control apertures.

10. In an apparatus for measuring the light absorption and transmission of a sample by subjecting the sample to light of different wave lengths, the apparatus having a light source, means separating light rays from the source into parallel light ray paths, a disc-shaped diaphragm rotating at a uniform rate and permitting the periodic and sequential passage of light rays of each path so that light rays can only be present in one path during any instant of time, light filter means disposed on the side of the diaphragm opposite the light source and having different filters disposed in the light ray paths, a single photocell disposed optically downstream of the filter means, and electrical signal emitting means in operative connection with the photocell for the emission of electrical signals indicative of the light passing the sample, the improvement comprising: a disc-shaped diaphragm having at least three radially and circumferentially non-overlapping light transmitting apertures, the number of apertures corresponding to the number of light ray paths, at least one dichroic filter disposed optically downstream of the filter means in a first light ray path and permitting passage of light of the first path received from the filter means, mirror means disposed in a second path opposite the dichroic filter so that light reflected by the mirror means is reflected by the dichroic mirror and directed towards the photocell in alignment with the first path, focusing lens means disposed between the photocell and the dichroic filter for directing light received from the light ray paths onto the photocell, the signal emitting means including a plurality of branch circuits corresponding to the plurality of light transmitting apertures in the disc-shaped diaphragm, control means, switch means operated by the control means for transmitting photocell output signals obtained from a light of a given path to the branch circuit to which the given path corresponds, and comparing circuit means for the emission of photocell signals caused by light pulses from the first and second paths with photocell signals caused from light pulses from a third reference path.

11. Apparatus according to claim 10 wherein the control means comprise a plurality of control photocells corresponding to the plurality of branch circuits, the control photocells being disposed on the side of the diaphragm opposite the light source and spaced in a radial direction of the diaphragm, the diaphragm comprising control apertures for the transmission of control light pulses to the control photocells, the control apertures being radially spaced from the light transmitting apertures, circumferentially offset with respect to the light transmitting apertures forward of the light transmitting apertures in the direction of rotation of the disc, and wherein the signal emitting means includes normally opened first switch means for each branch circuit operatively connected with the control photocells for closing the first switch means and thereby connecting the branch circuits with the photocell for the time period during which the light of a light path corresponding to the branch circuit of the closed first switch is directed onto the photocell.

12. Apparatus according to claim 11 wherein each branch circuit includes amplifying means connected to the side of the first switch means opposite the photocell, and including second switch means for each branch circuit disposed on the side of the amplifying means opposite the first switch means, the second switch means being normally closed, operatively connected with the control photocells for actuation thereby and synchronously opened with the closing of the first switch means for the same time periods, the second switch means connecting an output of the amplifying means with a ground.

13. Apparatus according to claim 12 wherein the first and second switch means comprise semi-conductors having control electrodes.

14. Apparatus according to claim 12 including differential amplifying means having a first input terminal connected to the branch circuit corresponding to the reference light path and a second input terminal connected to a constant reference voltage source, second differential amplifying means disposed between the first switch means and the photocell, the first and second differential amplifier being operatively connected so that voltage variations on the input side of the second amplifying means causes an adjustment of the amplification rate of the first amplifying means for maintaining the second amplifying means input voltage constant.

15. Apparatus according to claim 14 wherein the branch circuits corresponding to light ray paths directed through the sample are connected to means providing output signals proportional to the logarithm of the signals received from such branch circuits, and further including a third differential amplifying means receiving the logarithm signals and the constant reference voltage.

16. Apparatus according to claim 10 wherein the disc-shaped diaphragm defines the light transmitting apertures and a like plurality of control apertures, the apertures being disposed in a given sector of the disc, and wherein the disc has a plurality of such sectors each containing the same arrangement of light transmitting apertures and control apertures.

17. Apparatus according to claim 10 wherein the path defining means is disposed between the diaphragm and the light source and includes spaced apart light transmitting openings aligned with the rotational paths of the light transmitting apertures.

18. Apparatus according to claim 10 wherein the disc-shaped diaphragm defines the light transmitting apertures and a like number of control apertures, wherein the light ray path defining means is disposed between the light source and the disc-shaped diaphragm and comprises a fixed diaphragm having light transmitting openings aligned with paths of the light transmitting apertures, and second light transmitting control openings aligned with the paths of the control apertures in the diaphragm.

19. Apparatus according to claim 10 including a fixed diaphragm having an aperture aligned with the first path and an aperture aligned with the reference path, the fixed diaphragm being disposed between the focusing lens means adjacent the photocell and the dichroic filter.

20. Apparatus according to claim 10 wherein the light source comprises a point light source, and including light collimating lens means disposed between the light source and the diaphragm for forming a light beam of substantially parallel light.

21. Apparatus according to claim 10 wherein the filter means comprises a first blue filter disposed in the first light ray path and a second yellow filter disposed in the second light ray path, and wherein the dichroic filter is transparent to blue light and reflects yellow light.

22. Apparatus according to claim 10 including a lens between the dichroic filter and the sample for focusing light in the sample.

23. Apparatus according to claim 10 including lens means disposed in the reference light ray path for focusing light from the reference light ray path on the photocell.

24. Apparatus according to claim 10 wherein the light ray path forming means forms at least four light ray paths, wherein the disc-shaped diaphragm has four radially and circumferentially spaced apart, non-overlapping apertures, wherein the filter means for the fourth light ray path has filtering characteristics different from the filter means for the other light ray paths, and including: second mirror means directing light passing the filter means for the fourth light ray path towards the first path, a second dichroic filter disposed in the first path opposite the second mirror means permitting the passage of light received from the first dichroic filter and reflecting light received from the second mirror means in alignment with the first light ray path towards the photocell.

* * * * *